US012407123B1

(12) United States Patent
Godana et al.

(10) Patent No.: US 12,407,123 B1
(45) Date of Patent: Sep. 2, 2025

(54) ELECTRICALLY DISSIPATIVE FLEXIBLE UNITARY CONNECTOR INSERT

(71) Applicant: Quell Corporation, Albuquerque, NM (US)

(72) Inventors: Ken Godana, Albuquerque, NM (US); Dusty Erven, Albuquerque, NM (US); Karl Jurisson, Albuquerque, NM (US)

(73) Assignee: QUELL CORPORATION, Albuquerque, NM (US)

( * ) Notice: Subject to any disclaimer, the term of this patent is extended or adjusted under 35 U.S.C. 154(b) by 483 days.

(21) Appl. No.: 17/534,266

(22) Filed: Nov. 23, 2021

Related U.S. Application Data

(60) Provisional application No. 63/117,359, filed on Nov. 23, 2020.

(51) Int. Cl.
*H01R 13/04* (2006.01)
*H01R 13/20* (2006.01)
*H01R 13/6591* (2011.01)

(52) U.S. Cl.
CPC ............ *H01R 13/04* (2013.01); *H01R 13/20* (2013.01); *H01R 13/65914* (2020.08)

(58) Field of Classification Search
CPC .. H01R 13/04; H01R 13/20; H01R 13/65914; H01R 13/6581; H01R 13/6598
See application file for complete search history.

(56) References Cited

U.S. PATENT DOCUMENTS 3,539,973 A 11/1970 Antes et al.
3,648,002 A 3/1972 Du Rocher
3,849,708 A 11/1974 Leighton
3,982,320 A 9/1976 Buchoff et al.
4,003,621 A 1/1977 Lamp
4,050,756 A 9/1977 Moore
4,079,343 A 3/1978 Nijman
4,458,220 A 7/1984 Carter et al.
4,494,092 A 1/1985 Griffin
4,628,409 A 12/1986 Thompson et al.
4,791,391 A 12/1988 Linnell et al.
4,867,706 A 9/1989 Tang
4,932,673 A 6/1990 Domnikov et al.
5,011,434 A 4/1991 Blunt
5,045,249 A 9/1991 Jin et al.
5,109,596 A 5/1992 Driller et al.
(Continued)

FOREIGN PATENT DOCUMENTS

EP 0287349 A1 10/1988
EP 0643445 A2 3/1995
EP 0889678 A1 1/1999

OTHER PUBLICATIONS

Shin-Etsu Co. Ltd., Characteristic Properties of Silicon Rubber Compounds, Mar. 2020, p. 9 (Year: 2020).*

*Primary Examiner* — Vanessa Girardi

(74) *Attorney, Agent, or Firm* — Justin R. Jackson; Daniel Berenger-Russell; Peacock Law P.C.

(57) ABSTRACT

A connector insert that provides electrical dissipation for pins of an existing electrical connector that are desirable to have electrical dissipation, and which can provide electrical isolation from an electrically dissipative layer for pins which are desirable to not have electrical dissipation. The connector insert can include an electrically dissipative layer and one or more electrically non-conductive portions.

21 Claims, 8 Drawing Sheets

(56) References Cited

U.S. PATENT DOCUMENTS

| | | | |
|---|---|---|---|
| 5,181,859 | A | 1/1993 | Foreman et al. |
| 5,287,076 | A | 2/1994 | Johnescu et al. |
| 5,385,483 | A | 1/1995 | Lin |
| 5,415,569 | A | 5/1995 | Colleran et al. |
| 5,590,460 | A | 1/1997 | Distefano et al. |
| 5,661,450 | A | 8/1997 | Davidson |
| 5,759,047 | A | 6/1998 | Brodsky et al. |
| 5,984,691 | A | 11/1999 | Brodsky et al. |
| 6,094,115 | A | 7/2000 | Nguyen et al. |
| 6,183,272 | B1 | 2/2001 | Muller et al. |
| 6,413,119 | B1 | 7/2002 | Gabrisko, Jr. et al. |
| 6,417,747 | B1 | 7/2002 | Dearden et al. |
| 6,465,084 | B1 | 10/2002 | Curcio et al. |
| 6,716,063 | B1 | 4/2004 | Bryant et al. |
| 6,808,422 | B2 | 10/2004 | Chengalva |
| 6,961,231 | B1 | 11/2005 | Alexander et al. |
| 7,074,047 | B2 | 7/2006 | Tutt |
| 7,249,971 | B2 | 7/2007 | Burke et al. |
| 7,614,142 | B2 | 11/2009 | Shioga et al. |
| 7,841,862 | B2 | 11/2010 | Hasegawa |
| 8,225,500 | B2 | 7/2012 | Levante et al. |
| D746,236 | S | 12/2015 | Horchler |
| 9,478,887 | B2 * | 10/2016 | Godana .............. H01R 13/6588 |
| 9,583,884 | B1 | 2/2017 | Wang |
| 2003/0162287 | A1 | 8/2003 | Yamamoto et al. |
| 2010/0044089 | A1 | 2/2010 | Shibuya et al. |
| 2015/0126051 | A1 | 5/2015 | Godana et al. |
| 2017/0040751 | A1 | 2/2017 | Godana et al. |

* cited by examiner

ELECTRICALLY DISSIPATIVE FLEXIBLE UNITARY CONNECTOR INSERT

CROSS-REFERENCE TO RELATED APPLICATIONS

This application claims priority to and the benefit of the filing of U.S. Provisional Patent Application No. 63/117,359, entitled "Electrically Dissipative Flexible Unitary Connector Insert", filed on Nov. 23, 2020, and the specification and proposed claims thereof are incorporated herein by reference.

BACKGROUND OF THE INVENTION

Embodiments of the present invention relate to inserts that can be installed into existing and/or new electrical connectors to reliably prevent electrostatic buildup on connectors and/or cable harnesses.

Current technology in this field uses either standard circuit board technology or EESEAL® silicone inserts (EESEAL® is a federally registered trademark of Quell Corporation). The circuit board technology corrupts the existing environmental seal of the connector, so it is unsuitable for high-reliability connectors. The EESeal technology is made primarily from silicone elastomer and does not corrupt the existing seal. However, it does make use of discrete electronic components, for example, resistors which can be easily damaged in an electrostatic discharge ("ESD") transient environment. These ESD transients can also couple to neighboring circuits and damage interface components.

There is thus a present need for an insert that provides a high resistive electrically dissipative path to provide a slow, durable electrostatic bleed to prevent electrostatic discharge transients. The present invention provides this slow, durable electrostatic bleed through the use of an electrically dissipative elastomer without the need for discrete components or wires. Because connectors come in many shapes and sizes, and can be exposed to almost any operating environment, there is especially a need for an ESD dissipative connector insert that provides a high resistive bleed from the connector pins to the connector shell or ground pin which is highly durable and can be used on any conceivable connector configuration to control electrostatic build up and prevent ESD events.

BRIEF SUMMARY OF EMBODIMENTS OF THE PRESENT INVENTION

Embodiments of the present invention relate to a connector insert for an existing electrical connector having an electrically dissipative elastomer layer comprising a volume resistivity of about $10^6$ to about $10^{11}$ ohms-cm, the electrically dissipative elastomer layer comprising at least one opening positioned to allow a first pin of the existing electrical connector to pass through the electrically dissipative elastomer layer, and the electrically dissipative elastomer layer not providing structural rigidity to the existing electrical connector. The connector insert can include a non-conductive elastomer having a volume resistivity greater than about $10^{12}$ ohms-cm, the electrically dissipative elastomer layer having an opening around an insulated pin location, the opening configured to accommodate the non-conductive elastomer; and the non-conductive elastomer having an opening positioned to allow a second pin of the existing electrical connector to pass through the non-conductive elastomer.

The electrically dissipative elastomer layer can provide electrically dissipative connections and paths throughout the connector insert. The electrically dissipative elastomer layer can include an outside perimeter configured to fit inside an inside perimeter of a shell of the existing electrical connector. The electrically dissipative elastomer layer can include an outside perimeter configured to provide an interference fit inside an inside perimeter of a shell of the existing electrical connector. The electrically dissipative elastomer layer can be disposed within a shell of the existing electrical connector and at least the first pin of the existing electrical connector passes through the at least one opening in the electrically dissipative elastomer with an interference fit. The connector insert can be configured to be placed at an interface of a mating pair of existing connectors and can be configured to provide an environmental seal which prevents the passage of dust, fluids, gases, or other contaminants through the interface.

The connector insert can be configured to be placed within an internal portion of the existing electrical connector such that an interface between the existing electrical connector and an existing mating connector is not altered. The connector insert can also include at least one electrical shell contact that provides electrical connection between a shell of the existing electrical connector and the electrically dissipative elastomer layer. The at least one electrical shell contact can include a portion of the electrically dissipative elastomer layer itself. The electrically dissipative elastomer layer can be configured to provide an interference fit within the shell of the existing electrical connector. The non-conductive elastomer can maintain mechanical contact and electrical insulation around a perimeter of the second pin of the existing electrical connector. The electrically dissipative elastomer layer can be at least partially disposed within the non-conductive elastomer. The non-conductive elastomer can include two layers of non-conductive elastomer and the electrically dissipative elastomer layer can be at least partially sandwiched between the two layers of the non-conductive elastomer. Optionally, a perimeter portion of the electrically-dissipative elastomer layer is not sandwiched between the two layers of the non-conductive elastomer.

Embodiments of the present invention also relate to a method of fabricating an electrically-dissipative connector insert that includes fabricating a layer of flexible and compressible electrically dissipative elastomer and forming openings in the layer of flexible and compressible electrically dissipative elastomer which openings are configured to align with pins passing through an existing structural insert of an existing electrical connector. The method can also include fabricating a flexible and compressible electrically non-conductive elastomer, forming an opening in the flexible and compressible electrically non-conductive elastomer at a location of at least one of the pins of the existing electrical connector, and coupling together the layer of flexible and compressible electrically dissipative elastomer and the flexible and compressible electrically non-conductive elastomer. Optionally, forming openings in the layer of flexible and compressible electrically dissipative elastomer can include forming openings having a size smaller than the pins of the existing electrical connector for which electrical dissipation is desired. Forming openings in the layer of flexible and compressible electrically dissipative elastomer can include forming openings having a size which is larger than the pins of the existing electrical connector for which electrical dissipation is not desired.

Fabricating the flexible and compressible electrically non-conductive elastomer can include fabricating the flexible and compressible electrically non-conductive elastomer such that it is configured to fit within a formed opening of the layer of flexible and compressible electrically dissipative elastomer, such that the flexible and compressible electrically non-conductive elastomer provides electrical insulation between at least one pin of the existing electrical connector and the layer of flexible and compressible electrically dissipative elastomer. Optionally, the step of fabricating a flexible and compressible electrically non-conductive elastomer and the step of coupling together can include depositing the flexible and compressible electrically non-conductive elastomer within at least one of the formed openings in the layer of flexible and compressible electrically dissipative elastomer. In the method, the step of depositing the flexible and compressible electrically non-conductive elastomer can include depositing with a three-dimensional printer. The step of coupling together can include at least partially sandwiching the layer of flexible and compressible electrically dissipative elastomer between two portions of the flexible and compressible electrically non-conductive elastomer.

In one embodiment, the present invention relates to a connector insert comprising one layer of electrically dissipative elastomer. Optionally, a connector insert can be provided that includes one layer of electrically dissipative elastomer sandwiched between two layers of non-conductive elastomer. Preferably, the electrically dissipative layer has a volume resistivity of between about $10^6$ and about $10^{11}$ ohms-cm and the non-conductive elastomer layers have a volume resistivity above about $10^{12}$ ohms-cm. The insert can be placeable into an existing connector. The layers preferably have holes for pins of the connector and provide at least a connector shell contact, a ground plane, and a pin contact.

The invention is additionally of a concomitant method of employing a connector insert, the method comprising the steps of fabricating one layer of electrically dissipative elastomer or one layer of electrically dissipative elastomer sandwiched between two layers of non-conductive elastomer as an insert, and placing the insert into a connector. Preferably, the electrically dissipative layer has a volume resistivity of between about $10^6$ and $10^{11}$ ohms-cm and the non-conductive elastomer layers have a volume resistivity above $10^1$ ohms-cm. The connector may be an existing connector. Holes are preferably formed in the insert for the pins of the connector, and the insert provides at least a connector shell contact and a pin contact for the connector.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention preferably include at least substantially planar electrically dissipative and non-conductive layers within a connector insert. This provides a number of advantages. The high resistive electrically dissipative material provides a slow, durable electrostatic bleed, which prevents electrostatic discharge transients. Embodiments of the present invention eliminate the need to use discrete components such as resistors, which can be easily damaged in an ESD transient environment. Embodiments of the present invention eliminate the need to use wires and/or traces, which limit the electrostatic dissipation to these discrete conductive paths. The electrically dissipative layer can be formed from an electrically dissipative elastomer or other electrically dissipative material. However, in one embodiment, the preferred construct is an electrically dissipative silicone elastomer, with a volume resistivity between about $10^6$ and about $10^{11}$ ohms-cm.

In addition to being installed at the mating interface of a connector pair in a retrofit manner, this assembly can optionally be built into a single connector half, thus creating an electrically dissipative connector.

This type of construction utilizing a flexible electrically dissipative elastomer has application in fields other than electrical connectors. Such uses can include the medical field and consumer electronics, particularly where the electrically dissipative material is required to be compressed and/or flexed.

Figure 1A:
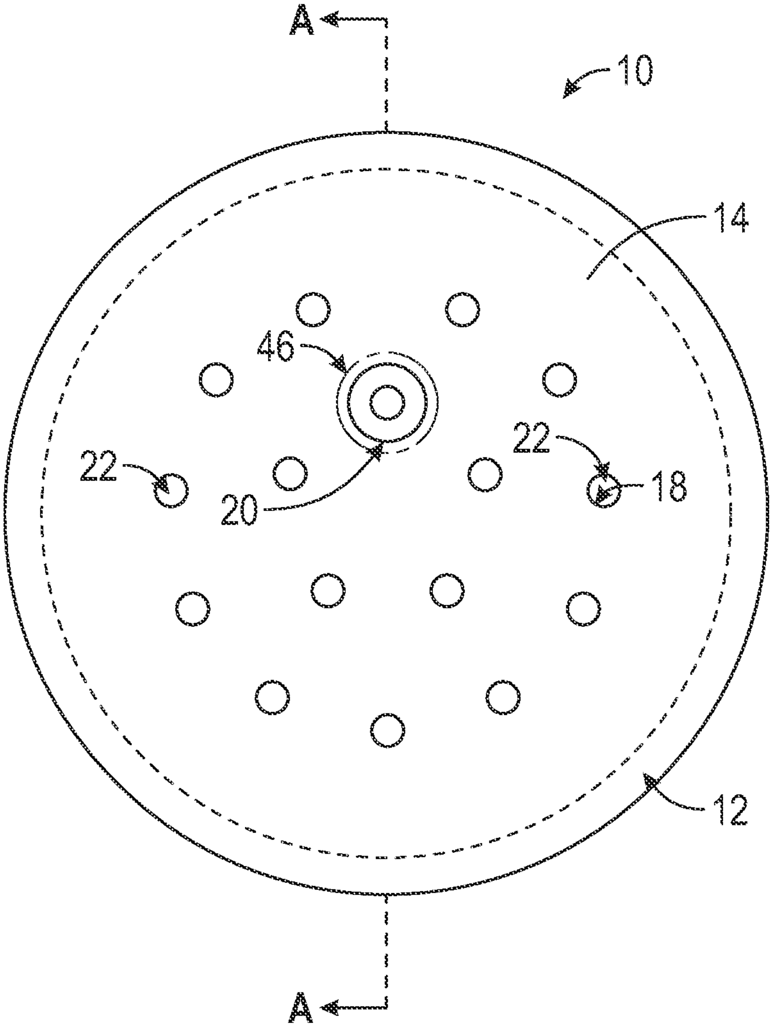
FIG. 1A is a drawing which illustrates a front view of a connector insert of one layer of electrically dissipative elastomer according to the invention.

Turning to the figures, FIG. 1A illustrates electrically dissipative connector insert 10 that is preferably formed from a planar electrically dissipative elastomer material, comprising electrically dissipative shell contact 12, electrically dissipative elastomer ground plane 14, electrically dissipative elastomer pin contact 18 (which can be an inner surface of an opening), non-conductive elastomer 20, and pin holes 22. This insert can optionally be installed over the pins of an existing connector to provide electrical dissipation.

The electrically dissipative elastomer shell contact 12 is preferably formed as an integral part of the electrically dissipative elastomer ground plane 14. The electrically dissipative elastomer shell contact 12 is preferably exposed around the periphery of insert 10 (See the lower call-outs in Fiqs 1B and 2B).

Electrically dissipative elastomer shell contact 12 can be configured such that it can make electrical contact to an existing connector shell in one or more of the following manners:

1) The outside perimeter of insert 10 is preferably formed such that it is slightly larger than the inside perimeter of the existing connector shell which insert 10 is intended to be installed within, so that it is compressed when installed, achieving electrically dissipative contact with the existing connector shell. For example, insert 10, which forms shell contact 12, along its perimeter or a portion thereof, can have a diameter (or s size for non-round connectors) that is less than 20% greater than the internal diameter or size of the connector shell and which is most preferably less than 5% greater than the internal diameter or size of the connector shell to provide an interference fit and thus provide electrical contact:
2) Electrically dissipative elastomer shell contact 12 can be exposed around the bottom surface (and/or can project slightly below the bottom surface of ground plane 14—the term “slightly below” meaning an amount of greater than about 0.0005 inches but most preferably less than about 0.1 inches, and most preferably meaning an amount of about 0.001) near a periphery of insert 10, or at another desirable location on insert 10, thus achieving electrically dissipative contact with the existing connector shell; and/or
3) Electrically dissipative elastomer shell contact 12 can be exposed around the top surface (and/or can project slightly above the top surface of ground plane 14—the term “slightly above” meaning an amount of greater than about 0.0005 inches but most preferably less than about 0.1 inches, and most preferably about 0.001) near a periphery of the insert 10 or at another desirable location on insert 10, thus permitting electrically dissipative contact with the existing mating connector shell along the top surface periphery.

The electrically dissipative elastomer pin contact 18 is shown in FIG. 1A wherein at least one pin hole 22 is created in the electrically dissipative elastomer ground plane 14 to provide an electrically dissipative connection between at least one pin of an existing connector and the existing connector shell. The diameter or width of pin hole 22 is preferably made smaller than the diameter or width of the pin of the existing connector that insert 10 will be installed within, so that when the existing pin is inserted into pin hole 22, the electrically dissipative elastomer stretches to accommodate the existing pin and thus forces edge 18 of electrically dissipative elastomer ground plane 14 into electrical contact against the existing pin (see FIGS. 3D and 3E). In one embodiment, the diameter or width of hole 22 is preferably about 1% to 50% smaller than the diameter or width of the pin which passes through it and more preferably about 1% to 10% smaller than the diameter or width of the pin which passes through it (FIG. 3D). This stretching of the electrically dissipative elastomer results in a tight fit around the existing pin, and electrically dissipative contact from the existing pin to the electrically dissipative elastomer is thereby achieved.

Figure 1B:
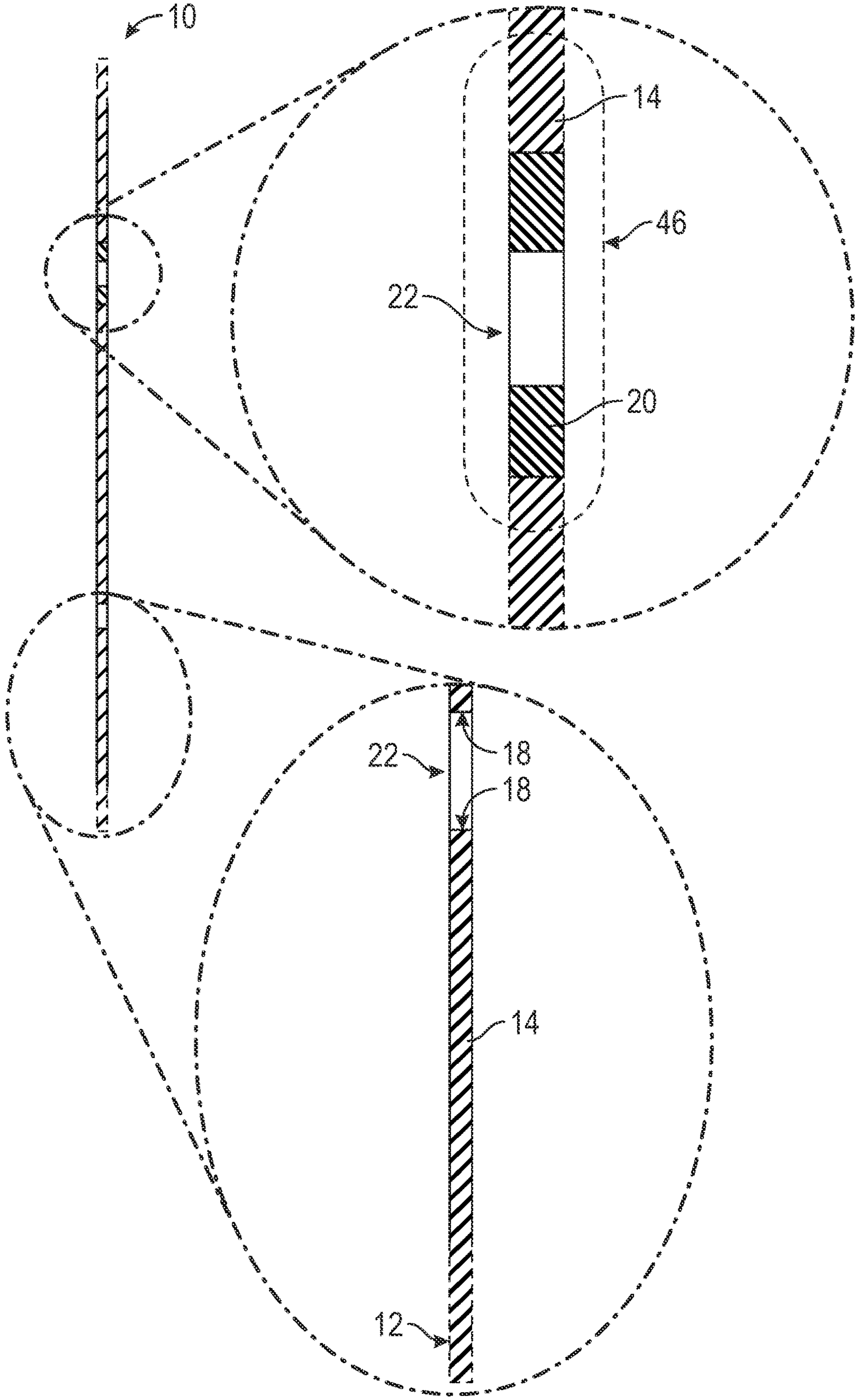
FIG. 1B is a section view drawing of the connector insert illustrated in FIG. 1A, taken along line A-A in the direction of the arrows and which features a detail view of an area of the connector insert near an isolated pin opening as well as a detail view of an area near a dissipative pin opening and the electrically dissipative elastomer shell contact.

As best illustrated in the detail drawing of FIG. 1B, for pin(s) of an existing connector that are desired to be electrically isolated from another existing pin and/or the existing connector shell, electrically isolated pin opening 46 is preferably provided. To provide electrically isolated pin opening 46, electrically dissipative elastomer ground plane 14 is preferably not provided in that area and instead, non-conductive elastomer 20 is preferably provided and at least one pin hole 22 is created in the non-conductive elastomer 20. Non-conductive elastomer 20 preferably ensures electrical isolation from an existing pin passing through electrically isolated pin opening 46 and electrically dissipative elastomer ground plane 14, thereby providing electrical isolation of the existing pin from all other existing pins and from the existing connector shell.

Figure 2A:
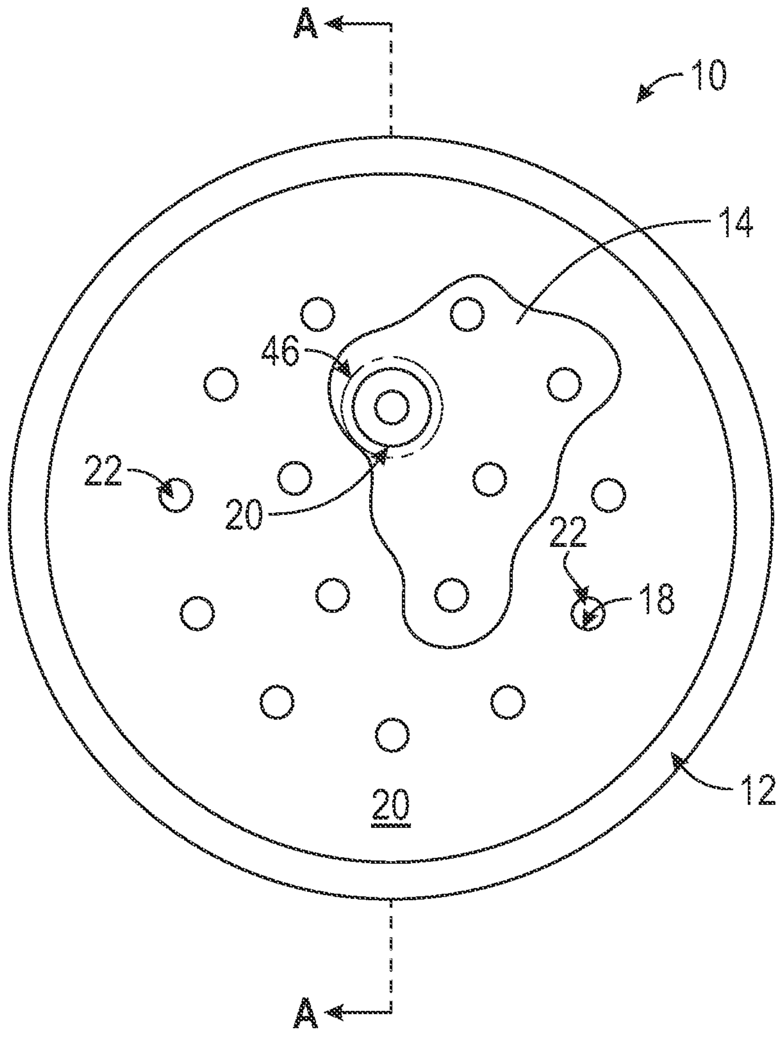
FIG. 2A is a diagram having a cut-away view of a connector insert with one layer of electrically dissipative elastomer sandwiched between two layers of non-conductive elastomer according to an embodiment of the present invention.
Figure 2B:
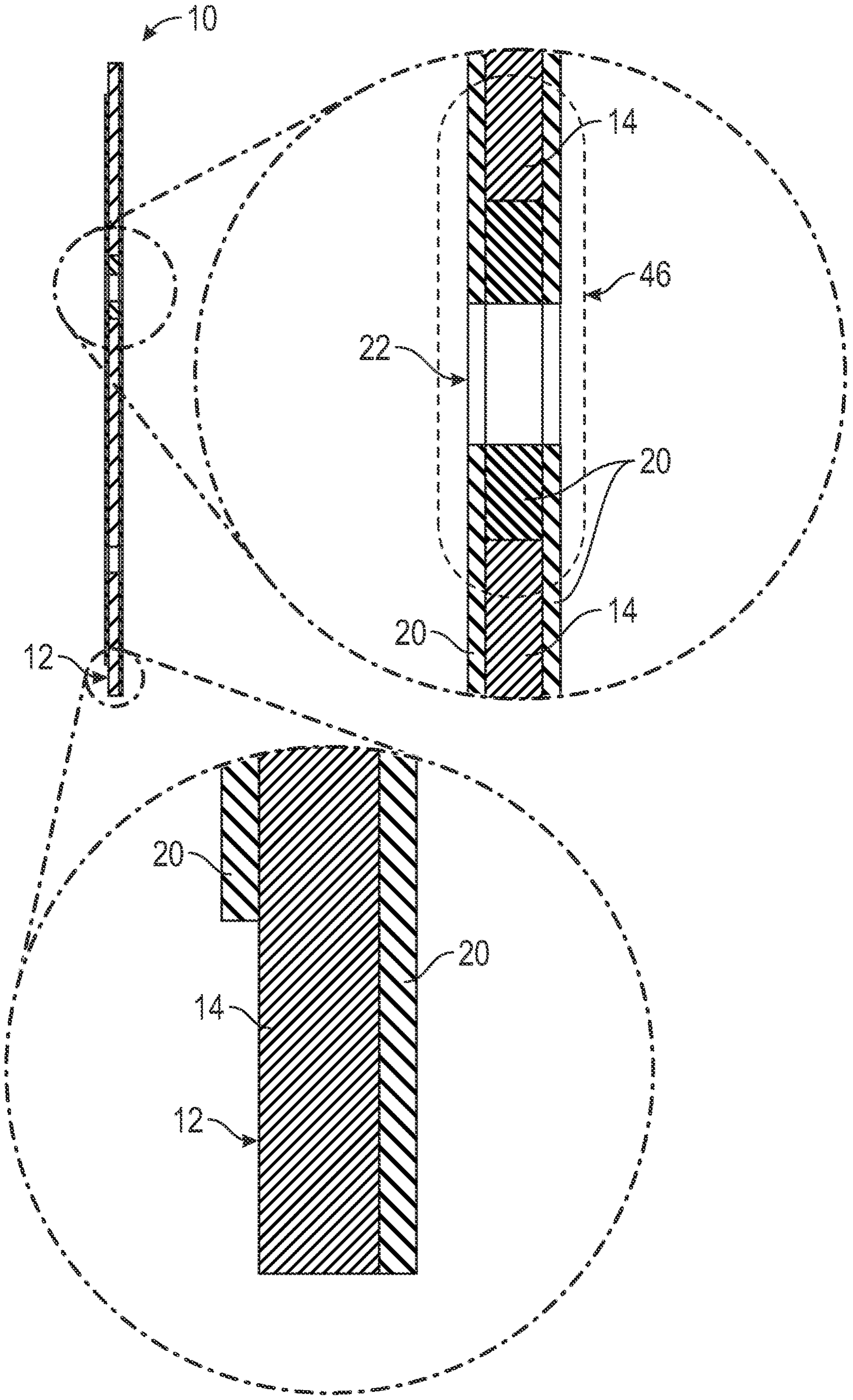
FIG. 2B is a section view drawing of the connector insert illustrated in FIG. 2A, taken along line A-A in the direction of the arrows and which features a detail view of an area of the connector insert near an isolated pin opening, as well as a detail view of the electrically dissipative elastomer shell contact.

In FIGS. 2A and 2B, non-conductive elastomer 20 can be used to encapsulate the front and back sides of connector insert 10. Electrically dissipative elastomer shell contact 12 is most preferably formed as an integral part of electrically dissipative elastomer ground plane 14 (for example, in one embodiment electrically dissipative elastomer shell contact 12 and ground plane 14 can be formed from a single continuous piece of electrically dissipative material). Electrically dissipative elastomer shell contact 12 can be exposed around the periphery of the insert 10. As with the embodiment of FIG. 1A, the outside perimeter of the insert 10 is preferably slightly larger than the inside perimeter of the existing connector shell so that insert 10 is compressed when installed, achieving electrically dissipative contact with the existing connector shell (most preferably by the same magnitude described for the embodiment of FIG. 1A). As with the embodiment of FIGS. 1A and 1B, electrically dissipative elastomer shell contact 12 can optionally be exposed around the bottom surface periphery of the insert 10, achieving electrically dissipative contact with the existing connector shell; and/or can be exposed around the top surface periphery of the insert 10, thus permitting electrically dissipative contact with the existing mating connector shell along the top surface periphery. Optionally, a portion of shell contact 12 can comprise protrude slightly above and/or below a surface of non-conductive elastomer to make electrical contact with connector shell. Optionally, the magnitude of such a protrusion can comprise an amount of greater than about 0.0005 inches but most preferably less than about 0.1 inches and most preferably about 0.001).

As with other embodiments, electrically dissipative elastomer ground plane 14 can be exposed along edge 18 (i.e. the inner surface) of pin hole 22 to make contact with a pin passing therethrough. Through this configuration, electrically dissipative elastomer pin contact at edge 18 can be formed as an integral part of electrically dissipative elastomer ground plane 14. By making the diameter of pin hole 22 smaller than the width or diameter of the pin of the existing connector that passes through pin hole 22, when the pin is inserted into pin hole 22, electrically dissipative elastomer ground plane 14 stretches to accommodate the pin. Most preferably, the difference in size between the width and/or diameter of pin hole 22 and pin that passes through it is preferably the same magnitude described for the embodiment of FIG. 1A. This stretching of electrically dissipative elastomer ground plane 14 results in a tight fit (interference fit) around the pin, and electrically dissipative contact from the pin to electrically dissipative elastomer ground plane 14 is thereby achieved.

In FIGS. 2A and 2B, electrically isolated pin opening 46 is shown wherein at least one pin hole is created in non-conductive elastomer 20 to provide electrical isolation between at least one pin of an existing connector and the existing connector shell.

Figure 3A:
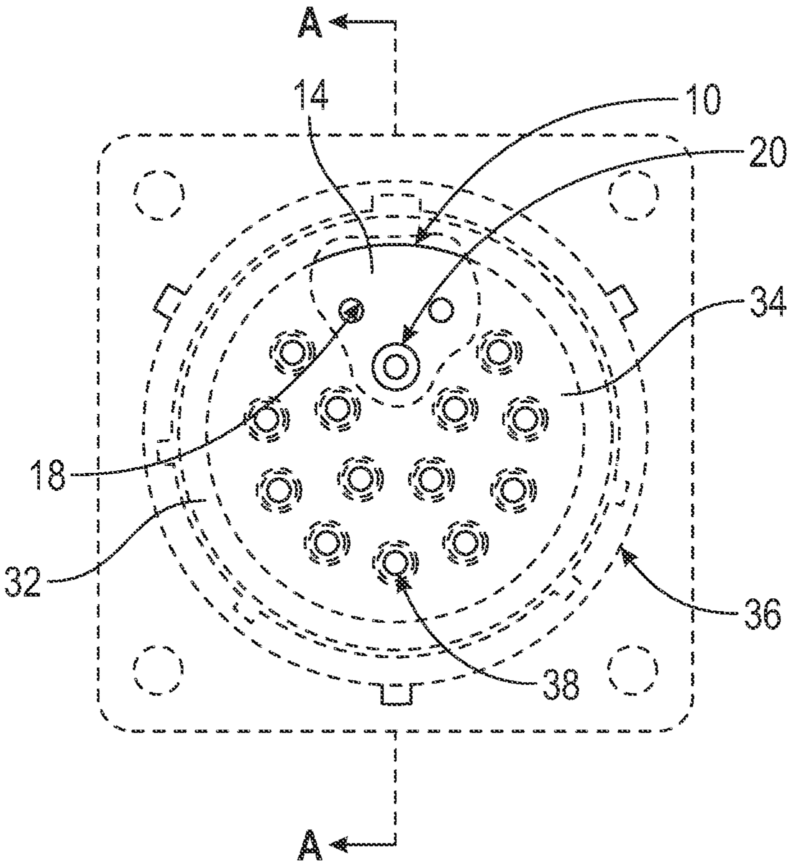
FIG. 3A is a drawing which illustrates a connector insert disposed within an operating environment of an existing connector assembly shown in phantom lines.
Figure 3B:
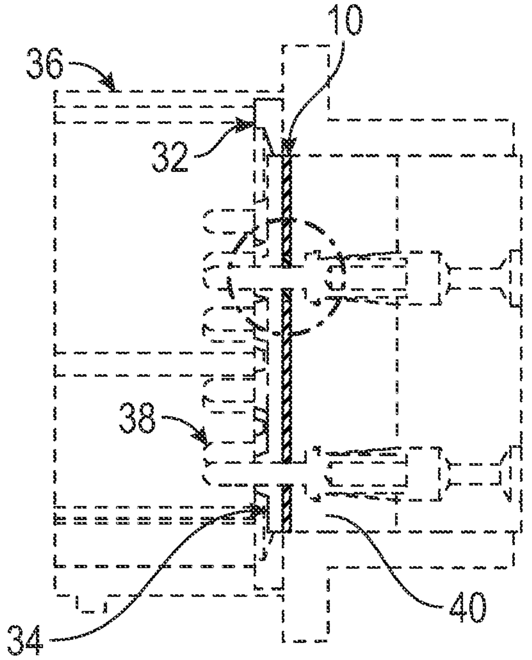
FIG. 3B is a section view drawing of the connector insert within the operating environment of the connector assembly illustrated in FIG. 3A, taken along line A-A in the direction of the arrows.
Figure 3C:
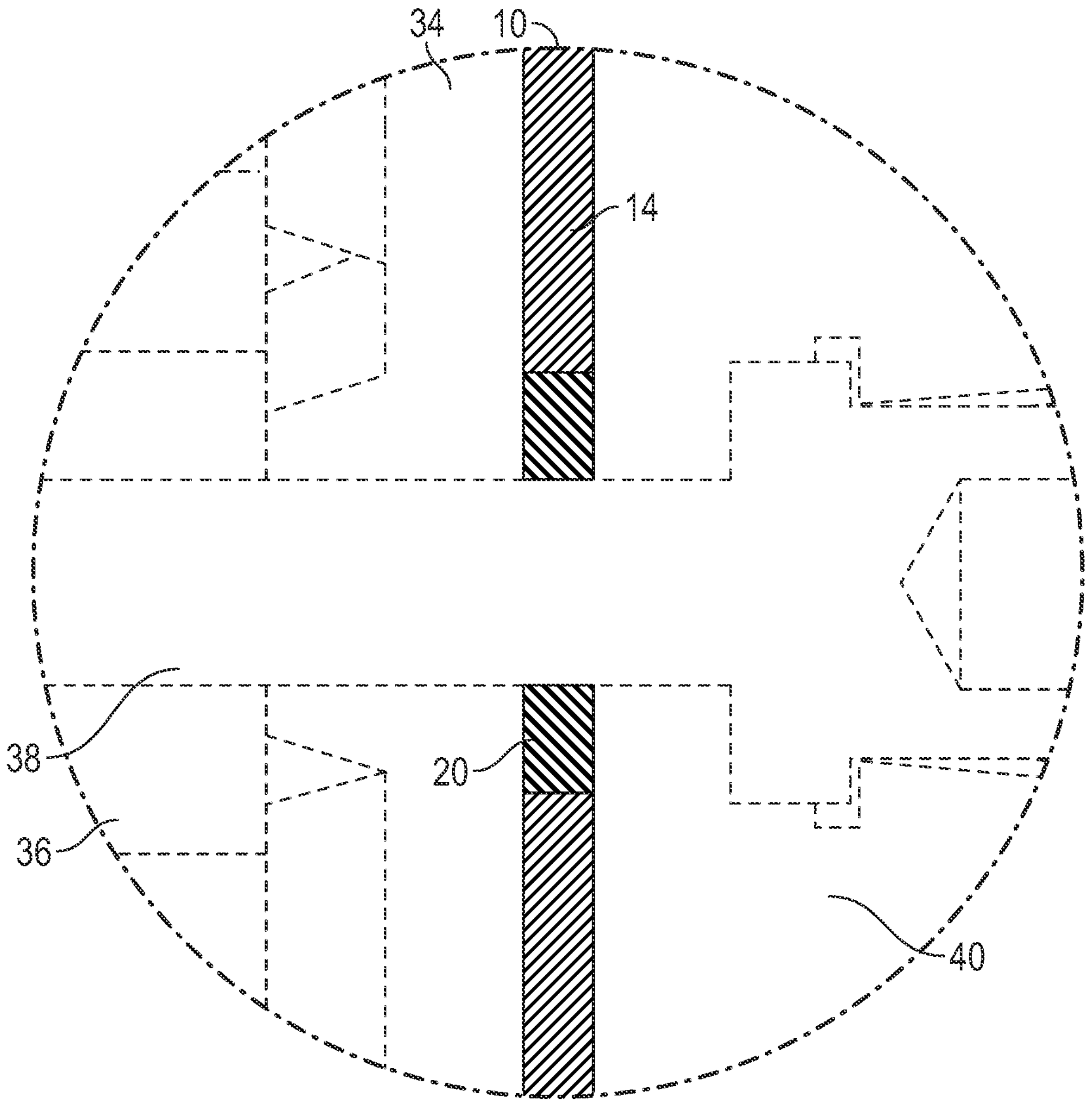
FIG. 3C is a detail view of the circular area of FIG. 3B where a pin of the operating environment passes through a connector insert of an embodiment of the present invention.
Figure 3D:
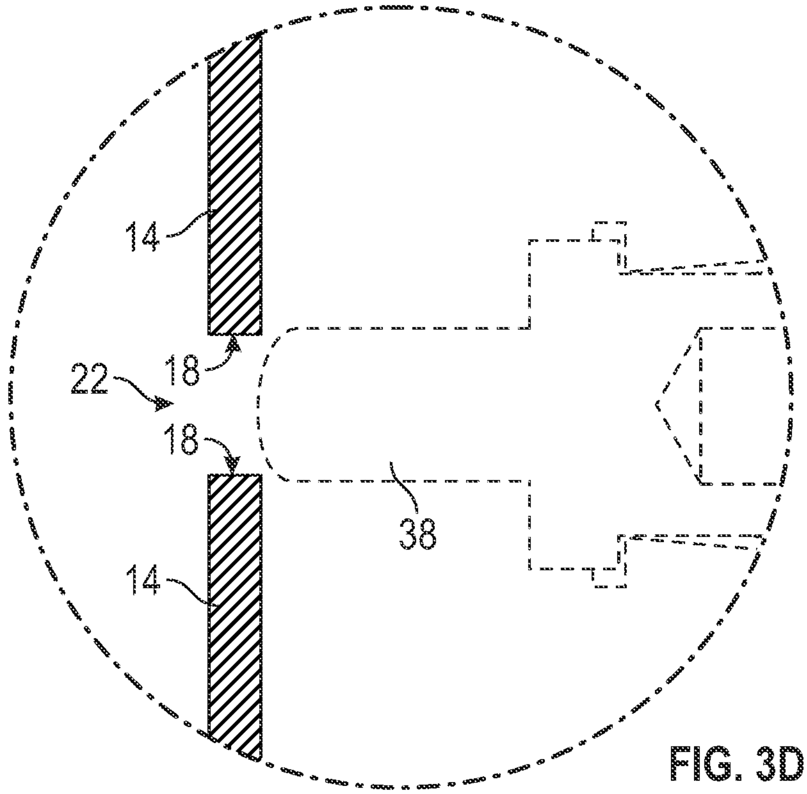
FIG. 3D is a drawing which illustrates a pin of a connector positioned in front of an opening in an electrically dissipative elastomer ground plane.
Figure 3E:
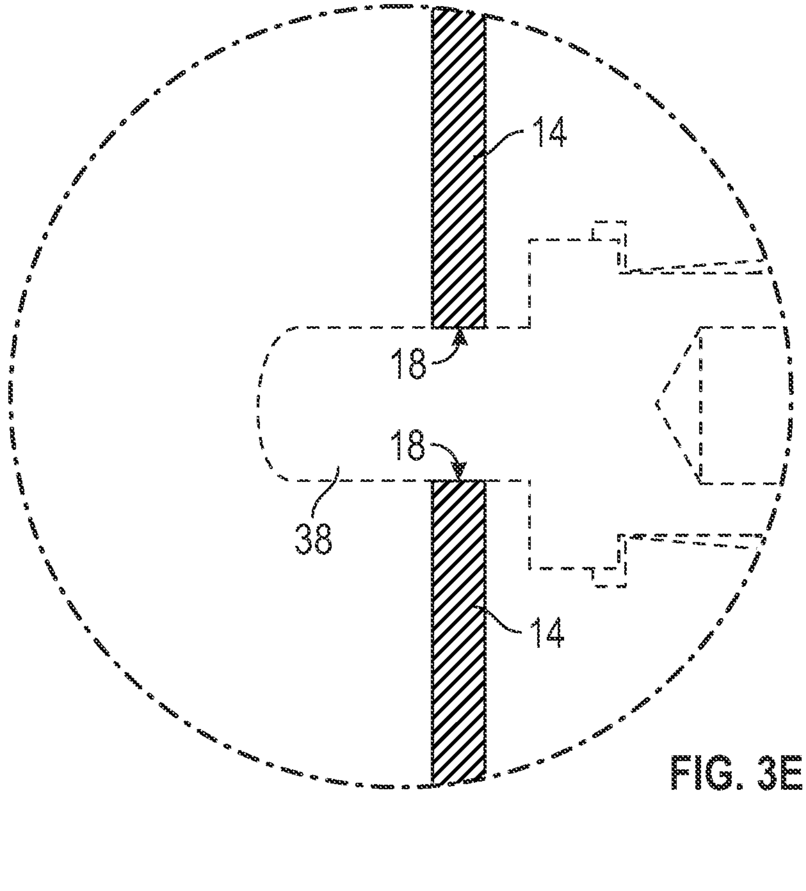
FIG. 3E is a drawing which illustrates a pin that has been positioned within an opening in an electrically dissipative elastomer ground plane.

According to embodiments of the present invention, with minor dimensional modifications, connector insert 10 can be made as an integral part of an existing connector as illustrated in FIGS. 3A, 3B and 3C, instead of an insert between a connector pair. This embodiment comprises electrically dissipative elastomer ground plane 14, including exposed edge 18 (i.e. the inner surface of the opening), which forms a pin contact, non-conductive elastomer 20, existing connector O-ring 32, existing connector interfacial seal 34, existing connector shell 36, existing connector pins 38, and existing connector insert 40. One example involves placing connector insert 10 between an existing connector insert and an existing connector interfacial seal. This permits the necessary contact with the existing connector pins and the existing connector shell, while preserving the mating and sealing features of a standard existing connector pair. With other modifications to a standard existing connector, the embodiment can be installed elsewhere within the existing connector as well. For example, the connector insert 10 can optionally be used as a replacement for the interfacial seal 34 of an existing connector, or a cavity in the rear of the existing connector can be provided to accommodate the placement of the connector insert 10.

Figure 4A:
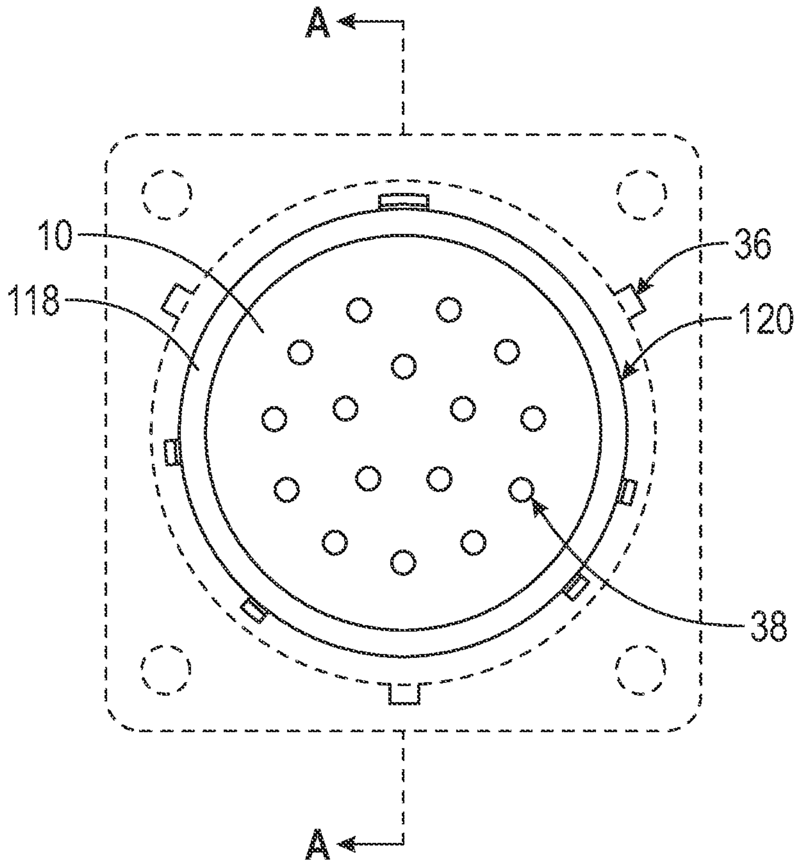
FIG. 4A is a drawing which illustrates a connector insert disposed within an operating environment of an existing connector assembly shown in phantom lines.
Figure 4B:
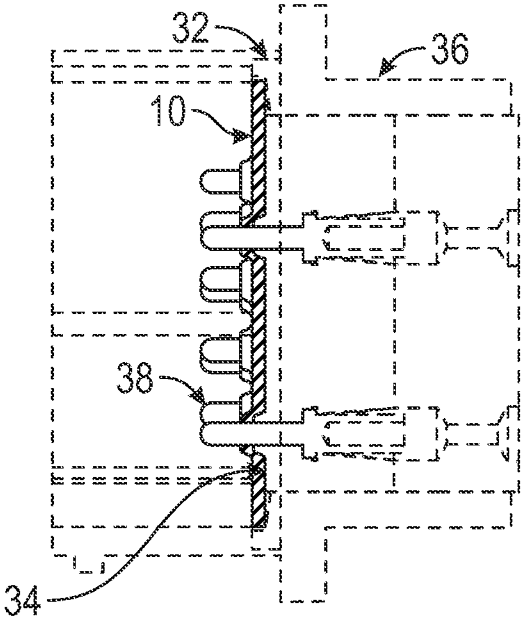
FIG. 4B is a section view drawing of the connector insert within the operating environment of the connector assembly illustrated in FIG. 4A, taken along line A-A in the direction of the arrows.

FIGS. 4A and 4B illustrate placement of connector insert 10, according to an embodiment of the present invention, into an existing connector, thereby providing a retrofit improvement to the existing connector. Insert 10 preferably includes outside perimeter 118 as installed over existing connector pins 38 and as oriented with respect to existing connector interfacial seal 34, existing connector O-ring 32, and existing connector shell 36, with the cavity having inside perimeter 120. In one embodiment, when in use, insert 10 is slid into an existing connector against the insert of the connector, thus providing a connector with two inserts. In one embodiment, the existing connector has an existing non-draining insert which preferably provides structural rigidity to the connector and insert 10 is preferably a flexible non-rigid insert which provides a high-resistance conductive drain path to ground.

Note that the terms "about" and/or "approximately" mean within twenty percent (20%) of the amount or value given.

Embodiments of the present invention can include every combination of features that are disclosed herein independently from each other. In one embodiment, the insert is flexible and does not provide structural integrity to the housing of the connector. In one embodiment, the insert is not formed from a mixture of a polymer and a conductive material. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A connector insert for an existing electrical connector comprising:

an electrically dissipative elastomer layer comprising a volume resistivity of about $10^6$ to about $10^{11}$ ohms-cm;

said electrically dissipative elastomer layer comprising at least one opening positioned to allow a first pin of the existing electrical connector to pass through said electrically dissipative elastomer layer; and said electrically dissipative elastomer layer not providing structural rigidity to the existing electrical connector.

2. The connector insert of claim 1 wherein said electrically dissipative elastomer layer provides electrically dissipative connections and paths throughout said connector insert.

3. The connector insert of claim 1 wherein said electrically dissipative elastomer layer comprises an outside perimeter configured to fit inside an inside perimeter of a shell of the existing electrical connector.

4. The connector insert of claim 1 wherein said electrically dissipative elastomer layer comprises an outside perimeter configured to provide an interference fit inside an inside perimeter of a shell of the existing electrical connector.

5. The connector insert of claim 1 wherein said electrically dissipative elastomer layer is disposed within a shell of the existing electrical connector and wherein at least the first pin of the existing electrical connector passes through the at least one opening in said electrically dissipative elastomer with an interference fit.

6. The connector insert of claim 1 wherein said connector insert is configured to be placed at an interface of a mating pair of existing connectors and to provide an environmental seal which prevents the passage of dust, fluids, gases, or other contaminants through the interface.

7. The connector insert of claim 1 wherein said connector insert is configured to be placed within an internal portion of the existing electrical connector such that an interface between the existing electrical connector and an existing mating connector is not altered.

8. The connector insert of claim 1 further comprising at least one electrical shell contact that provides electrical connection between a shell of the existing electrical connector and said electrically dissipative elastomer layer.

9. The connector insert of claim 8 wherein said at least one electrical shell contact comprises a portion of said electrically dissipative elastomer layer itself.

10. The connector insert of claim 9 wherein said electrically dissipative elastomer layer is configured to provide an interference fit within the shell of the existing electrical connector.

11. The connector insert of claim 1 further comprising a non-conductive elastomer having a volume resistivity greater than about $10^{12}$ ohms-cm, said electrically dissipative elastomer layer comprising an opening around an insulated pin location, the opening configured to accommodate said non-conductive elastomer; and said non-conductive elastomer comprising an opening positioned to allow a second pin of the existing electrical connector to pass through said non-conductive elastomer.

12. The connector insert of claim 11 wherein said non-conductive elastomer maintains mechanical contact and electrical insulation around a perimeter of the second pin of the existing electrical connector.

13. The connector insert of claim 11 wherein said electrically dissipative elastomer layer is at least partially disposed within said non-conductive elastomer.

14. The connector insert of claim 13 wherein said non-conductive elastomer comprises two layers of non-conductive elastomer and wherein said electrically dissipative elastomer layer is at least partially sandwiched between said two layers of said non-conductive elastomer.

15. The connector insert of claim 14 wherein a perimeter portion of said electrically dissipative elastomer layer is not sandwiched between said two layers of said non-conductive elastomer.

16. A method of fabricating an electrically dissipative connector insert comprising:

fabricating a layer of flexible and compressible electrically dissipative elastomer; and forming openings in the layer of flexible and compressible electrically dissipative elastomer, which openings are configured to align with pins passing through an existing structural insert of an existing electrical connector.

17. The method of claim 16 wherein forming openings in the layer of flexible and compressible electrically dissipative elastomer comprises forming openings having a size smaller than the pins of the existing electrical connector for which electrical dissipation is desired.

18. The method of claim 16 wherein forming openings in the layer of flexible and compressible electrically dissipative elastomer comprises forming openings having a size which is larger than the pins of the existing electrical connector for which electrical dissipation is not desired.

19. The method of claim 16 further comprising fabricating a flexible and compressible electrically non-conductive elastomer;

forming an opening in the flexible and compressible electrically non-conductive elastomer at a location of at least one of the pins of the existing electrical connector; and coupling together the layer of flexible and compressible electrically dissipative elastomer and the flexible and compressible electrically non-conductive elastomer.

20. The method of claim 19 wherein fabricating the flexible and compressible electrically non-conductive elastomer comprises fabricating the flexible and compressible electrically non-conductive elastomer such that it is configured to fit within a formed opening of the layer of flexible and compressible electrically dissipative elastomer, such that the flexible and compressible electrically non-conductive elastomer provides electrical insulation between at least one pin of the existing electrical connector and the layer of flexible and compressible electrically dissipative elastomer.

21. The method of claim 19 wherein coupling together comprises at least partially sandwiching the layer of flexible and compressible electrically dissipative elastomer between two portions of the flexible and compressible electrically non-conductive elastomer.

* * * * *